July 26, 1960 M. F. BAUER 2,946,607
SELF-FLARING TUBE COUPLING
Filed Dec. 6, 1956
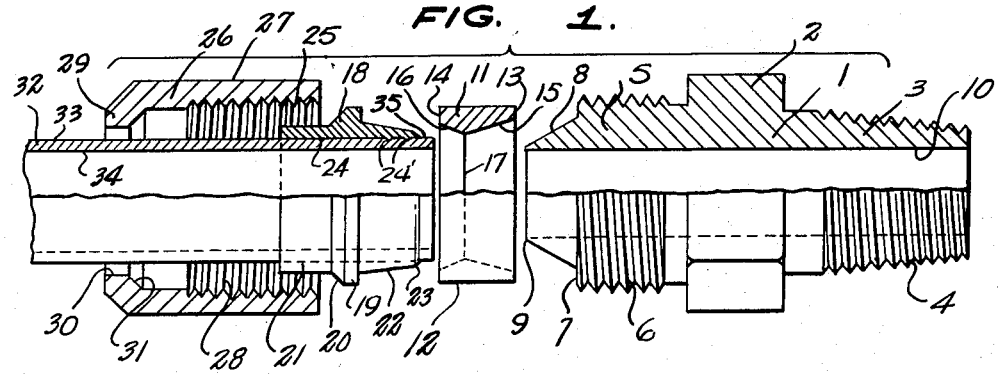
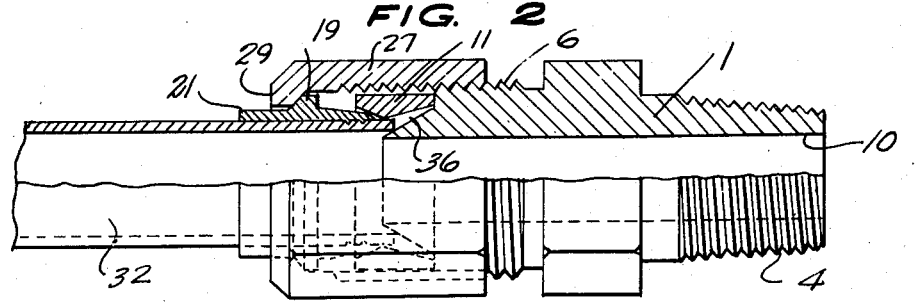
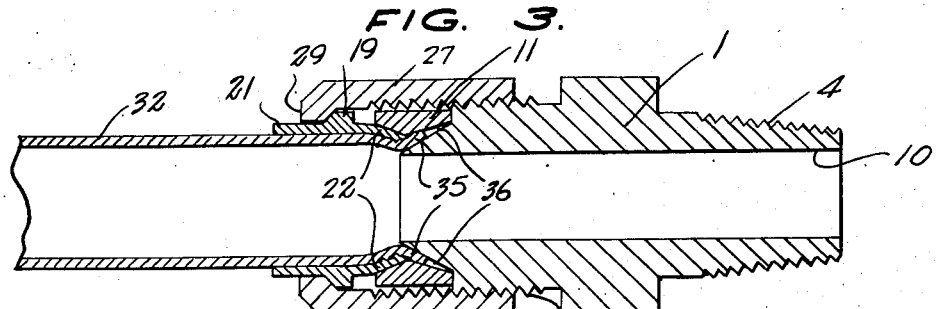
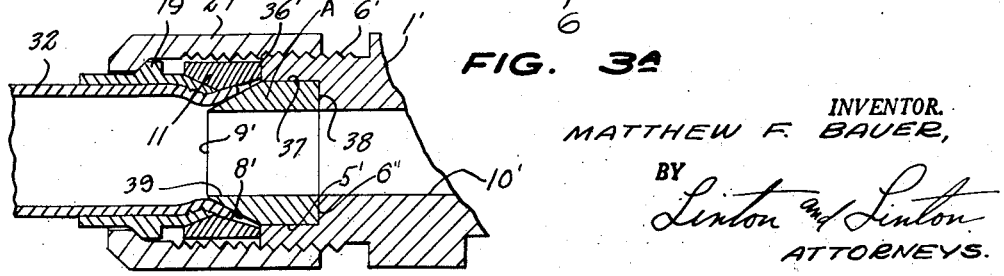
INVENTOR.
MATTHEW F. BAUER,
BY
*Linton and Linton*
ATTORNEYS.

2,946,607
SELF-FLARING TUBE COUPLING

Matthew F. Bauer, 16911 St. Clair Ave., Cleveland, Ohio

Filed Dec. 6, 1956, Ser. No. 626,619

3 Claims. (Cl. 285—334.5)

The present invention is directed to couplings for connecting a tube end to devices having threaded openings and is more particularly concerned with couplings of the self flaring type.

The principal object of the present invention is to provide a coupling capable of receiving, flaring and forming leak-proof seals with a tube end portion and which is particularly for use with metallic tubing.

Another and important object of the invention is to provide a tube coupling capable of flaring tube ends including tubes formed of hard metals and having components capable of being produced at a relatively low cost rendering the coupling commercially feasible.

A still further and important object of the invention is to provide a tube coupling capable of connecting tubing of various wall thicknesses, which coupling can be assembled and disassembled as often as required and which coupling includes a tube flaring wall exteriorly of the connection body of the coupling, a sleeve for forcing the tubing onto said wall and a separate collar encasing said sleeve and tube about said wall bending the sleeve inwardly for a better grip on the tubing and also retaining and forming seals with the resultant flared tube end.

Further objects of the invention will be in part obvious and in part pointed out in the following description of the accompanying drawings wherein:

Fig. 1 is an exploded side elevation partly in section of the present coupling.

Fig. 2 is a side elevation also partly in section of the present coupling at the beginning of the connection of a tube thereto.

Fig. 3 is a longitudinal section of the coupling assembled with a tube connected thereto.

Fig. 3a is a longitudinal section of a modified form of the coupling assembled to a tube.

Referring now more particularly to the accompanying drawing wherein like and corresponding parts are referred to by similar reference characters, numeral 1 indicates an elongated tubular connection body having a laterally and outwardly extending peripheral wall 2 capable of receiving a tool, such as a wrench for example, for use in rotating said body. Said wall 2 is in the medial portion of said body while one end portion 3 of said body tapers inwardly and has peripheral threads 4. The other end portion 5 of said body on the opposite side of said wall 2 and has a longitudinally extending threaded periphery 6. End wall 7 extends inwardly at substantially a right angle to said periphery 6 with a tube end flaring mandrel 8 having the configuration of a truncated annular cone extending outwardly and inwardly from said end wall 7. Said body 1 further has a flow bore defined by an interior annular wall 10 extending completely therethrough with said wall extending axially of said body particularly at the end portion 5 thereof. Said mandrel 8 extends on an acute angle relative to the axis of said body from the interior end of wall 7 to wall 10 forming a relatively sharp annular edge 9 therewith.

A collar 11 has an annular periphery 12 whose outside diameter is less than the periphery 6 of said body. The opposite sides 13 and 14 of said collar extend substantially at right angles to said periphery 12 and side 13 is of substantially the same width as end wall 7 of said body. The bore of said collar is defined by a pair of diverging facets 15 and 16 with facet 15 extending inwardly and downwardly from end 13 towards a medial portion of said collar on an acute angle relative to the axis of said collar and which angle is less than the angle of said mandrel 8. Facet 16 extends inwardly from said end 14 of said collar on an acute angle relative to the axis of said collar and downwardly within the bore of said collar meeting facet 15 in an annular apex 17.

A sleeve 18 has a laterally extending annular peripheral flange 19 with a downwardly slanting side forming a shoulder 20 which meets with a longitudinally extending annular peripheral portion 21 of said sleeve. The remainder of said sleeve forms a compression portion having an inwardly tapering periphery 22 extending from the base of flange 19 on an acute angle relative to the axis of said sleeve which is smaller than the angle of the facet 16. An inwardly and sharply tapered end wall 23 is contiguous with said periphery 22. Sleeve 18 further has a bore defined by an annular longitudinally extending wall 24. A plurality of walls 24' extend laterally of and inwardly from bore wall 24 each terminating in sharp biting edges at their free ends.

A tubular member 26 has a polygonal sided periphery 27 for being engaged by a tool, such as a wrench for example, for being turned thereby. Member 26 further has an inner longitudinally extending threaded wall 25 which is of substantially the same diameter as periphery 6 of body 1 with the threads thereof capable of being in threaded engagement with the threads of periphery 6 whereby said member can be drawn onto or from said body 1. Member 26 further has an inwardly directed lateral annular flange 26 forming an opening 30, which opening 30 is of a diameter slightly larger than the diameter of the periphery 21 of sleeve 18. The inner side wall 31 of said flange is on a slant and is capable of mating with shoulder 20 of said sleeve 18 when the peripheral portion 21 extends through opening 30 as shown in Figs. 2 and 3.

Wall 24 of sleeve 18 is of a diameter for receiving the tube 32 to be connected to the coupling therethrough with the periphery 33 of said tube in slidable contact with wall 24 being frictionally engaged by the walls. The interior wall 34 defining the bore of said tube is of a slightly larger diameter than the rim 9 of body 1 and capable of receiving the leading edge of mandrel 8 therein.

To assemble the present coupling to the end of a tube 32, said tube is extended through opening 30 of member 26 and through the bore of sleeve 18 with a leading end portion 35 of said tube extending beyond the end wall 23 of sleeve 18. Said end 35 of the tube is then introduced through inner rim 17 of collar 11 until the compressible portion 22 of sleeve 18 engages facet 16 of collar 11. Mandrel 8 is inserted into collar 11 between facet 15 with rim 9 entering bore 34 of said tube with wall 7 of said body thereupon contacting side 13 of said collar. Tubular member 26 is then slid towards said body 1 until threaded periphery 25 engages threaded periphery 6 whereupon the elements of the coupling and the tubing will have assumed the position shown in Fig. 2 of the drawing.

Rotation of either or both body 1 and member 26 in the correct direction for drawing the same together will cause shoulder 31 of member 26 to push shoulder 20 of sleeve 18 towards said body 1 whereupon compressible portion 22 of said sleeve will be cammed downwardly by facet 16 of collar 11 pushing into the periphery of tube 32 and firmly grasping the same. Continued movement of member 26 and/or body 1 will force the tube end 35 further upwardly on mandrel 8 whereby said tube end will be flared outwardly until it engages facet 15 of collar 13 as shown in Fig. 3 of the drawing. Tube 35 thereupon partially or completely fills the annular chamber 36 of wedge shaped cross sectional configuration formed between mandrel 8 and facet 15 of collar 11 due to the difference in their angles so that said tube end 35 forms seals with said mandrel 8 and collar 11 which will prevent the escape of media from within the bores of body 1 and tube 32 even though the media may be under large pressures.

The elements forming the present tube coupling can be especially employed for connecting metal tubing thereto particularly hardened metals such as hard steel. However, when employed for connecting hardened metals, mandrel 8 and collar 11 should be preferably of a heat treated metal.

The present coupling is capable of connecting various tubings thereto of different thicknesses between the periphery 33 and the inner wall 34 thereof as the chamber 36 being of an inwardly tapering configuration can receive and compress tube ends of varying thicknesses.

The modified form of coupling shown in Fig. 3a is the same as the previously described coupling except that the mandrel is provided by a separate insert. That is, the connection body 1' has a threaded periphery 6' and an annular recess formed in the end thereof by a longitudinal circular wall 5' and a lateral bottom wall 6". A mandrel insert A has an annular periphery 37 of substantially the same diameter as wall 5' and a bottom 38 capable of being positioned against wall 6" whereby the insert A when positioned in the recessed end of said body 1' frictionally engages with wall 5' retaining the insert in connection with said body. Said insert further has an inwardly tapering peripheral end portion 8' which at its outer end forms a circular edge 9' with the wall 39 defining the bore of said insert. Said interior annular wall 39 is of substantially the same diameter as wall 10' defining the flow bore of said body.

The assembly of this modified form of coupling is the same as that described for the coupling of Fig. 1 as collar 11, sleeve 18, and tubular member 26 can be employed therewith for connecting tube 32 thereto. The tapering end 8' of said insert will extend into the tube end 35 flaring the same as member 26 is tightened on body 1' with the threads 25 of said member being in threaded engagement with threads 6' of said body.

The present coupling is capable of considerable modification and such changes thereto as come within the scope of the appended claims are deemed to be a part of the invention.

What I claim is:

1. A tube coupling comprising an elongated body having a bore extending axially therethrough, said body further having a tube flaring end portion provided by an annular peripheral portion tapering longitudinally outwardly and radially inwardly from one end of said body, said body having a lateral outwardly extending peripheral wall contiguous with said tube flaring end portion and a threaded peripheral portion extending longitudinally of said body from the outer end of said wall, an annular collar having an end detachably positioned against said body lateral wall and an inner annular frusto-conical wall decreasing in diameter from said collar end and being radially outward of said body tube end flaring portion and diverging therefrom forming an annular chamber of a wedge shaped cross-sectional configuration therebetween the mouth of which is capable of receiving an end of the tube receiving said tube flaring end portion, said collar having a second inner annular wall contiguous with and flaring outwardly from said first mentioned inner wall to the other end of said collar with said inner walls defining the bore of said collar, a sleeve having an axial bore capable of closely receiving the tube to be connected therethrough and a peripheral outwardly extending shoulder, said sleeve having a compressible inwardly slanting peripheral end portion, a tubular member having a threaded bore capable of being in threaded engagement with said body threaded portion for drawing said member to said body and said member having a shoulder for engaging said sleeve shoulder and pushing said sleeve compressible end portion upon the drawing of said member, into and against said collar second inner wall being compressed thereby into said tube forming an annular seal therewith and inserting said body tube flaring end portion into said tube flaring the same within said annular chamber compressing the end of said tube forming annular seals between said tube and said tube flaring end portion and also said collar.

2. A tube coupling comprising a tubular elongated body having an inner wall of circular cross-sectional configuration extending axially of and through said body defining the bore of said body, said body having a stepped peripheral end portion provided by a pair of offsets connected by a laterally extending wall with the outer offset thereof being threaded and the inner offset tapering inwardly from said laterally extending wall to said body inner wall meeting in an annular edge therewith providing a tube end flaring mandrel, a collar having an end detachably abutting flush with the lateral peripheral wall of said body, said collar having a pair of diverging contiguous inner walls defining the bore of said collar with one of said bore walls adjacent said abutting end being concentric with and extending downwardly along but spaced from said mandrel forming an inwardly tapering chamber with said mandrel having its widest end adjacent said annular edge providing an annular opening capable of receiving said tube therein and the other bore wall an outwardly flaring mouth for said chamber beyond said mandrel, a sleeve having a bore for closely receiving the tube to be connected therethrough and a laterally extending peripheral shoulder, said sleeve having an end portion capable of being partially inserted within said other bore wall of said collar and being thereby compressed inwardly against said tube bending said tube inwardly to said mandrel and a member having a threaded bore in threaded engagement with said body threaded offset for drawing said member to said body and a shoulder for engaging said sleeve shoulder during said drawing of said member moving said sleeve end portion into said collar other bore wall for being compressed gripping and pushing said tube onto said body inner offset for flaring the portion of said tube beyond the bend therein into said chamber against said collar first mentioned bore wall with said tube forming seals with said sleeve, collar and body.

3. A tube coupling as claimed in claim 2, wherein said mandrel and said first mentioned bore wall are each straight and meet adjacent said wall providing an annular tapering chamber of a wedge-shaped cross-sectional configuration having an inner portion of less thickness than said tube for compressing and forming seals with said tube.

References Cited in the file of this patent
UNITED STATES PATENTS

| | | |
|---|---|---|
| 2,320,813 | Cowles | June 1, 1943 |
| 2,453,127 | Guarnaschelli | Nov. 9, 1948 |
| 2,466,317 | Kane | Apr. 5, 1949 |
| 2,497,273 | Richardson | Feb. 14, 1950 |
| 2,737,403 | Ellis | Mar. 6, 1956 |
| 2,768,846 | Gratzmuller | Oct. 30, 1956 |
| 2,850,303 | Bauer | Sept. 2, 1958 |